(12) United States Patent
Jain et al.

(10) Patent No.: US 11,909,823 B2
(45) Date of Patent: Feb. 20, 2024

(54) METHOD AND APPARATUS FOR GENERATING ALTERNATIVE ROUTINES IN AN IOT ENVIRONMENT

(71) Applicant: Samsung Electronics Co., Ltd., Suwon-si (KR)

(72) Inventors: Ankit Jain, Delhi (IN); Siba Prasad Samal, Bangalore (IN); Ravi Nanjundappa, Bangalore (IN); Niranjan B Patil, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 17/411,334

(22) Filed: Aug. 25, 2021

(65) Prior Publication Data

US 2022/0201078 A1 Jun. 23, 2022

(30) Foreign Application Priority Data

Dec. 17, 2020 (IN) .............................. 202041054870

(51) Int. Cl.
*H04L 67/12* (2022.01)
*G16Y 40/35* (2020.01)
*G06F 40/30* (2020.01)

(52) U.S. Cl.
CPC .............. *H04L 67/12* (2013.01); *G06F 40/30* (2020.01); *G16Y 40/35* (2020.01)

(58) Field of Classification Search
CPC .......... H04L 67/12; G06F 40/30; G16Y 40/35
See application file for complete search history.

(56) References Cited

U.S. PATENT DOCUMENTS

| | | | |
|---|---|---|---|
| 8,577,392 B1 | 11/2013 | Pai et al. | |
| 10,990,894 B2* | 4/2021 | Shaashua | G06F 16/35 |
| 11,361,266 B2* | 6/2022 | Miller | G06Q 10/06316 |
| 2014/0371922 A1* | 12/2014 | Weaver | G06Q 30/0257 |
| | | | 700/291 |
| 2019/0199547 A1 | 6/2019 | Bazar et al. | |
| 2019/0318283 A1* | 10/2019 | Kelly | G06Q 10/1095 |
| 2020/0076898 A1* | 3/2020 | Shukla | H04M 1/72403 |

FOREIGN PATENT DOCUMENTS

| | | |
|---|---|---|
| IN | 201741038541 A | 5/2019 |
| WO | 2019217248 A1 | 11/2019 |

* cited by examiner

*Primary Examiner* — Soe Hlaing

(57) ABSTRACT

Provided are an apparatus and a method for generating an alternative routine, the method comprising monitoring a first routine comprising at least one activity representing at least one interaction of a user with one or more IoT devices, determining semantic information associated with the at least one activity, and generating at least one second routine comprising one or more activities corresponding to the at least one activity based on the semantic information associated with the at least one activity.

18 Claims, 7 Drawing Sheets

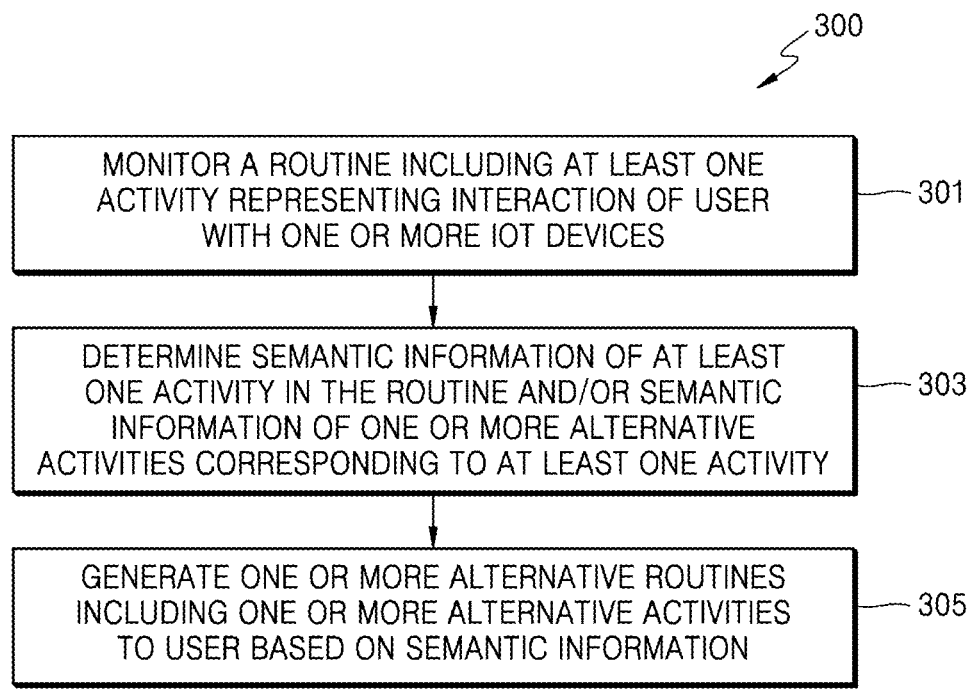

METHOD AND APPARATUS FOR GENERATING ALTERNATIVE ROUTINES IN AN IOT ENVIRONMENT

CROSS REFERENCES TO RELATED APPLICATION

This application is based on and claims priority under 35 U.S.C. § 119 of an Indian patent application number 202041054870, filed on Dec. 17, 2020, in the Indian Patent Office, the disclosure of which is incorporated by reference herein in its entirety.

BACKGROUND

1. Field

The disclosure relates to Internet of Things (IoT) devices and a method of generating alternative routines to a user in an IoT environment.

2. Description of Related Art

Internet of Things (IoT) refers to a network of devices that are connected to one another via the Internet. IoT devices has become a part of user routine. Currently, a user makes use of a plurality of IoT devices to perform various tasks. For example, a user uses mobile applications, smart TVs, coffee maker and the like. In effect, a routine of the user can be determined using the IoT devices used by the user on a daily basis. Further, automation and generation of routines have gained prominence with increase in number of IoT devices and interactions of a user with plurality of the IoT devices in an IoT environment. The user is dependent on the plurality of IoT devices to perform daily routines. Hence, optimizing the operation of the plurality of IoT devices may optimize the routines of the user. Also, there is a need for optimizing the routines of the user in the IoT environment to enhance user interaction with the plurality of IoT devices and user experience in the IoT environment.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, disclosed is a method of generating an alternative routine, the method including monitoring a first routine comprising at least one activity representing at least one interaction of a user with one or more IoT devices, determining semantic information associated with the at least one activity; and generating at least one second routine comprising one or more activities corresponding to the at least one activity based on the semantic information associated with the at least one activity.

In an embodiment, provided is an apparatus including a memory which stores a first routine comprising at least one activity representing at least one interaction of a user with one or more IoT devices; and a processor configured to monitor the first routine, determine semantic information associated with the at least one activity, and generate at least one second routine comprising one or more activities corresponding to the at least one activity based on the semantic information associated with the at least one activity.

The foregoing summary is illustrative only and is not intended to be in any way limiting. In addition to the illustrative aspects, embodiments, and features described above, further aspects, embodiments, and features will become apparent by reference to the drawings and the following detailed description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a flow chart for generating alternative routines to a user in an IoT environment, according to an embodiment of the disclosure;

DETAILED DESCRIPTION

Figure 1:
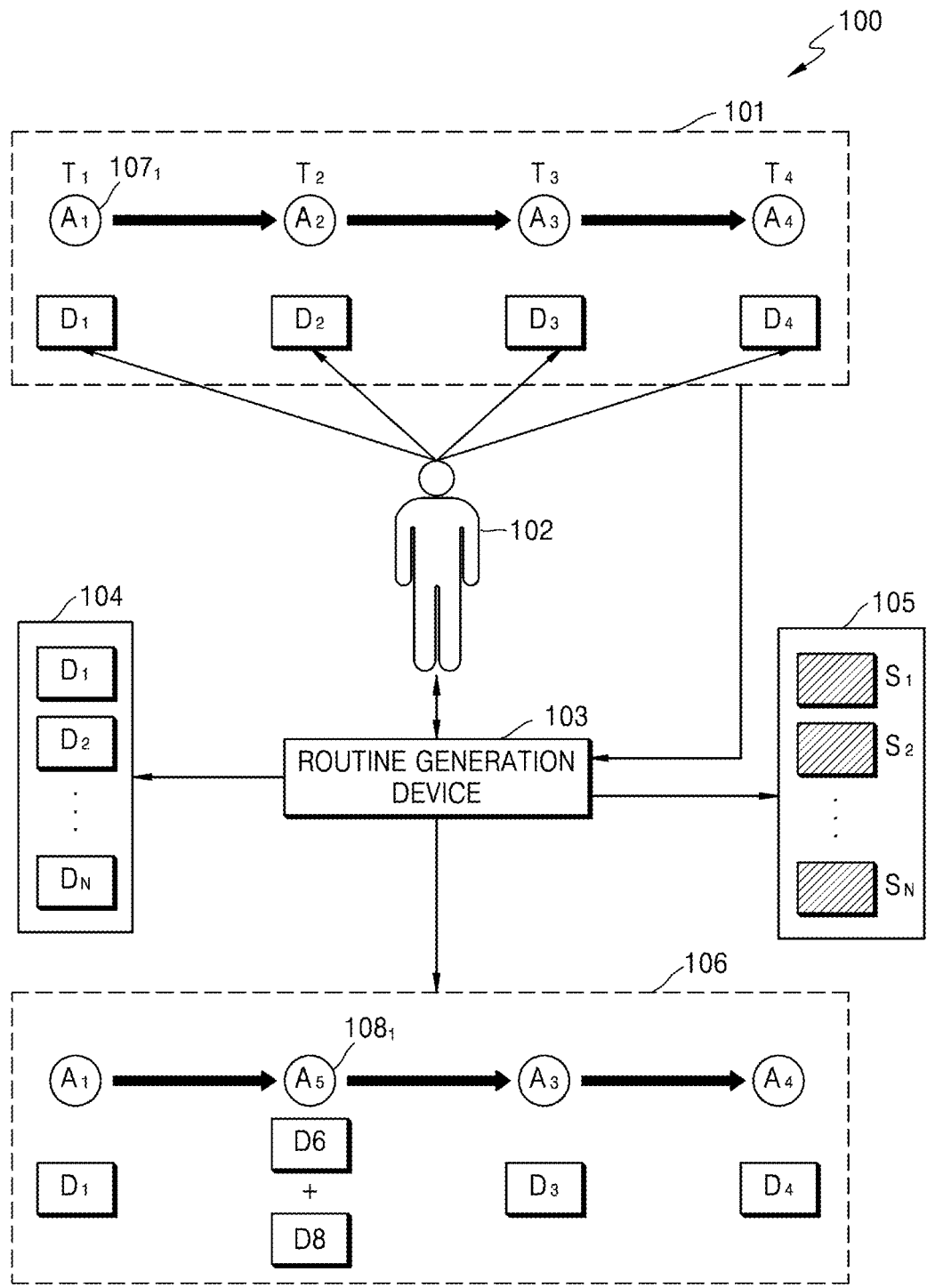
FIG. 1 illustrates generation of alternative routines for a user in an IoT environment, according to an embodiment of the disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the embodiments can be practiced without those specifically defined matters. Also, well-known functions or constructions are not described in detail since they would obscure the description with unnecessary detail.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "1st" or "first" and "2nd" or "second" may use corresponding components regardless of importance or order and are used to distinguish one component from another without limiting the components.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

In the present document, the word "exemplary" is used herein to mean "serving as an example, instance, or illustration." Any embodiment or implementation of the disclosure described herein as "exemplary" is not necessarily to be construed as preferred or advantageous over other embodiments.

Embodiments of the disclosure will be described below in detail with reference to the accompanying drawings.

Techniques of optimizing the routines include recommending a set of routines to the user based on user data. However, optimizing the routines using such techniques may not be efficient, since only the user data is used to recommend the set of routines. Further, some techniques deal with maintaining a schedule of routines with respect to a schedule of a user. Further, such techniques includes recommending a single action over a device/situation and adding the action to an existing routine. The addition is performed upon user confirmation and the new included action is also executed upon subsequent initialization of the existing routine. However, such techniques do not optimize the routine based on deviations in user actions from actions in existing routine of the user.

Embodiments of the disclosure relate to generating alternative routines to a user in an Internet of Things (IoT) environment. A routine of the user, including activities performed day-to-day by the user, is monitored. The user interacts with various IoT devices for performing the activities. For example, the activity may be watching a television, opening a front door, baking with an oven, etc. The IoT devices may be the television, the front door, the oven. Further, the IoT environment includes other devices in the IoT environment. The other devices are termed as alternative IoT devices in the disclosure. Activities performed using the alternative IoT devices are termed as alternative activities. Semantic information of the activities in the routine and/or semantic information of the alternative activities are determined and generated. Alternative routines including the alternative activities are generated based on the semantic information of the activities in the routine and the alternative activities. Determining the semantic information helps in optimizing the generation of the alternative routines in an efficient manner. Also, different parameters—experience parameters—with respect to cost spent for the routine, time spent for the routine, ease of use of the IoT devices, a degree of conveniences in using IoT devices such as voice enabling, usage pattern, fast recognition (face recognition compared to inputting password), unused features, a distance from the user, detecting of a new IoT device, power-saving in the routine, battery availability in the routine, a conflict of device usage in the routine and the like are considered for the generation of the alternative routines. Thus, the user experience in the IoT environment is substantially improved.

FIG. 1 illustrates generation of alternative routines for a user in an IoT environment 100, according to an embodiment of the disclosure. The IoT environment 100 shown in FIG. 1 includes a user 102, a routine generation device 103, a first set of IoT devices 104, a second set of IoT devices 105, and one or more alternative routines 106. Further, a routine of the user 102 is represented as 101 in FIG. 1. The user 102 may interact with the first set of IoT devices 104 according to the routine 101. The routine 101 may be an existing routine of the user 102. The routine 101 of the user 102 may include at least one activity 107 indicating an interaction of the user 102 with one or more IoT devices determined from the first set of IoT devices 104. The at least one activity 107 is represented as A1, A2, A3, and A4 in FIG. 1. The user 102 may interact with the one or more IoT devices D1, D2, D3, and D4 for performing activities A1, A2, A3, and A4, respectively according to the routine 101. Throughout the description, at least one activity 107 and activities 107 are used interchangeably. For example, the routine 101 may include the activities 107 such as meditating, listening to music, and cooking. The user 102 may interact with the one or more IoT devices from the first set of IoT devices 104 for performing the at least one activity 107. The first set of IoT devices 104 may be devices in the IoT environment 100 which the user 102 may interact to perform the at least one activity 107, one or more alternative activities 108, and the like. The first set of IoT devices 104 may include the one or more IoT devices (that are used to perform the routine 101) and different IoT devices (that are not used to perform the routine 101) in the IoT environment 100. The first set of IoT devices 104 are shown as D1, D2, D3, D4, D5, D6, DN in FIG. 1. For example, the first set of IoT devices 104 may include a television, a smartphone, a refrigerator, an air conditioner, a microwave oven, and the like. The one or more IoT devices may be used for performing the activities of meditating, listening to music, cooling the room, and cooking, respectively.

The routine generation device 103 is configured to generate the one or more alternative routines 106 to the user 102 in the IoT environment 100. In an embodiment, the routine generation device 103 may be a part of one the IoT device from the first set of IoT devices 104 in the IoT environment 100. For example, the routine generation device 103 may be a smartphone. In an embodiment, the routine generation device 103 may be a server or a cloud-based server communicating with the user 102, the first set of IoT devices 104, and/or the second set of IoT devices 105 in the IoT environment 100. The routine generation device 103 may receive required data from the user 102, the first set of IoT devices 104, and the second set of IoT devices 105, and provide the user with the generated one or more alternative routines 106. The routine generation device 103 may communicate with the user 102, the first set of IoT devices 104, and the second set of IoT devices 105 via a communication network (not shown in FIG. 1). The communication network may include, without limitation, a direct interconnection, Local Area Network (LAN), Wide Area Network (WAN), wireless network (e.g., using Wireless Application Protocol), the Internet, and the like. In an embodiment, the routine generation device 103 may communicate with the user 102, the first set of IoT devices 104, and the second set of IoT devices 105 via a wired/wireless network.

In an embodiment, the routine generation device 103 may be configured to monitor the routine 101 of the user 102. In one embodiment, the routine 101 is pre-determined based on an operational state, a corresponding timestamp associated with the operational state of the one or more IoT devices, and settings of the one or more IoT devices for a pre-determined time period. For example, the routine 101 is predetermined by monitoring interactions of the user 102 with the one or more IoT devices D1, D2, D3, and D4, for a month. The pre-determined time period may be one month, one week, or 8 hours in an embodiment. The user 102 may switch on Air Conditioner (AC) at time T1, watch television at time T2, cook food using a microwave oven at time T3, and take online classes using smartphone at time T4 daily. The routine 101 may include switching on the AC, watching the television, cooking food, and taking the online classes. The timestamp of the routine may include T1, T2, T3, and T4. The timestamp of the routine may represent an order of activities to be performed in the routine. The operational state may represent the state of the IoT devices at the corresponding timestamp. The operations state of each of the AC, the television, the microwave oven, and the smartphone may be, for example, 'switch to a dehumidifier mode from a sleep mode', 'power on and a USB mode among a broadcasting mode, a USB mode', 'an external source mode, etc.', 'power on and baking state', and 'power on and a power saving mode', respectively. The settings of the IoT devices may represent settings of IoT devices for performing a corresponding activity. For example, the settings of each of the AC, the television, the microwave oven, and the smartphone may be, for example, 'level 2 dehumidifier mode among 5 different dehumidifier levels', 'USB mode with volume settings along with a Bluetooth speaker', 'temperature 200° C. for 20 minutes for the bread baking', 'launching an application for on-line class'. In an embodiment, the routine generation device 103 may receive the routine 101 from the user 102. In another embodiment, the routine generation device 103 may generate the routine 101 of the user 102. The generated routine 101 may be pre-stored in a storage of the routine generation device 103.

Further, the routine generation device 103 may determine and generate semantic information associated with the at least one activity 107 in the routine 101 and/or semantic information associated with one or more alternative activities 108 replacing the at least one activity 107. For example, the user tries to open the front door of the user's home for jogging exercise on Saturday morning 7 am. The front door locking device recognizes the user's activity of 'opening the door' event. In an embodiment, the routine generation device 103 may collect time information of "Saturday, 7 am" and the event of 'opening the door' from the front door locking device. Unlike other weekdays, the routine generation device 103 may predict that the user may come back in one hour after jogging routine based on the time information and/or stored past (previous) routine record on the weekend and determine the semantic information of "open the front door" based on the time information of "Saturday, 7 am" and the event of 'opening the door' to go out of the home derived from the front door locking device. In an embodiment, the outdoor temperature measured by a temperature measuring device may be also provided, via a network, to the routine generation device 103 for determining the semantic information.

The semantic information associated with the at least one activity 107 and the one or more alternative activities 108 are determined to identify the one or more alternative routines 106. The routine generation device 103 may generate the one or more alternative routines 106 based on the determination. The one or more alternative activities 108 are selected in the one or more alternative routines 106 based on a similarity between the semantic information associated with the at least one activity 107 and the semantic information associated with the one or more alternative activities 108. The one or more alternative routines 106 may be optimized routines alternative to the routine 101. For example, the alternative routine may be optimized in consideration of the user experience. The one or more alternative routines 106 may include the one or more alternative activities 108. The one or more alternative activities 108 are associated with the one or more alternative IoT devices. The one or more alternative IoT devices may be either different IoT devices from the first set of IoT devices 104 interacted by the user 102 or the same one or more IoT devices operated in different settings or in a different order. For example, as shown in FIG. 1, the routine 101 includes the activities A1, A2, A3, and A4. The user 102 interacts with the one or more IoT devices D1, D2, D3, and D4 for performing activities A1, A2, A3, and A4, respectively. The routine generation device 103 monitors the routine 101 and generates, based on the semantic information, an alternative routine 106 where IoT devices D1, D6+D8, D3 and D4 are used to perform corresponding activities A1, A5, A3 and A4.

In the alternative, routine 106 includes the activities A1, A5, A3, and A4. The activity A5 is alternative to the activity A2. The activity A5 is performed with alternative IoT devices D6 and D8. The alternative IoT devices D6 and D8 are alternative to IoT device D2. For example, the IoT device D2 may be an air conditioner. The alternative IoT devices D6 and D8 may be a dehumidifier and a fan which may functionally replace the air conditioner with low power consumption. The activity A2 may indicate an interaction of the user 102 with the air conditioner such as turning on the air conditioner. The activity A5 may indicate an interaction of the user 102 with the dehumidifier and the fan.

The routine generation device 103 may detect the operational state of the one or more IoT devices and the settings of the one or more IoT devices, and a change in the operational state of the second set of IoT devices 105. The second set of IoT devices 105 are shown as S1, S2, ... SN in FIG. 1. The second set of devices 105 may include sensors. For example, AC may be a part of the routine 101. The user 102 may have operated the AC in a cooling mode for ten days when it is hot and sunny. The user 102 may have operated the AC in a dehumidifier mode due to the rain for the last 3 days. The routine generation device 103 may be trained to determine the one or more alternative routines 106 based on the interaction between the user 102 and the one or more IoT devices at different conditions. For example, the interactions of the user 102 with the one or more IoT devices may vary with different environmental conditions. The routine generation device 103 may generate the one or more alternative routines based on indoor temperature, outdoor temperature and indoor humidity. The routine generation device 103 may determine the operational state of the one or more IoT devices (for example, the AC) and the settings of the one or more IoT devices, and a change in the operational state of the second set of IoT devices 105 with a sensor (for example, a rain sensor). In an embodiment, the sensor may be included in the second set of IoT devices as one of IoT device. The routine generation device 103 may determine the semantic information that the user 102 operated the AC in a cooling mode when the weather was sunny and operated the AC in a dehumidifier mode when it rains. Thus, the routine generation device 103 may generate an alternative routine to operate the AC in the dehumidifier mode when it rains. The routine generation device 103 may automatically operate the AC in the dehumidifier mode or suggest the user 102 to operate the AC in the dehumidifier mode. Alternatively, to reduce the power consumption, the routine generation device 103 may suggest the user 102 to operate a separate dehumidifier device instead of operating the AC in the dehumidifier mode. The routine generation device 103 may generate the one or more alternative routines 106 using an Artificial Intelligence (AI) model. A person skilled in the art may appreciate that any known AI techniques can be used to generate the one or more alternative routines 106.

Figure 2:
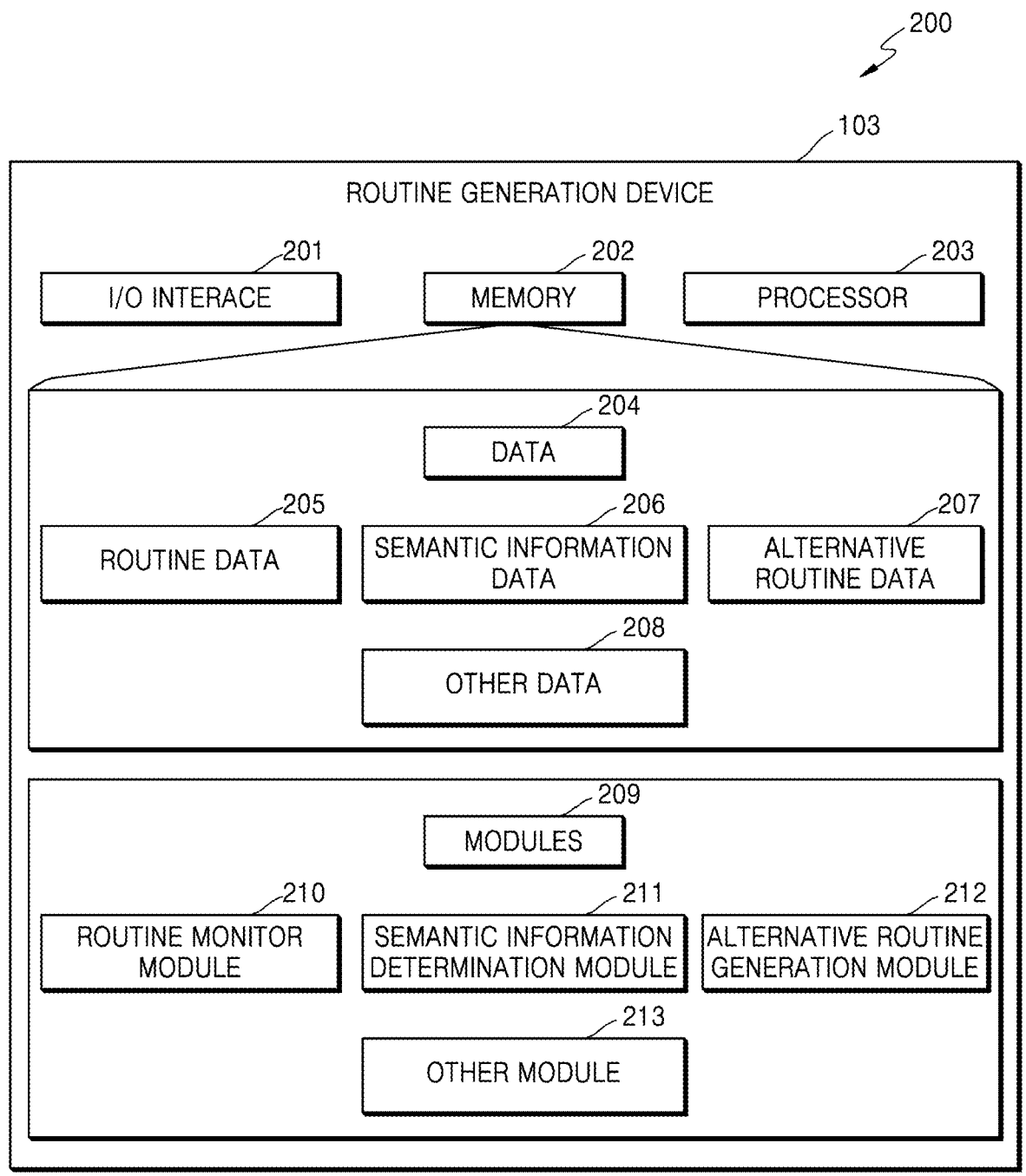
FIG. 2 illustrates block diagram of a routine generation device for generating one or more alternative routines to a user, according to an embodiment of the disclosure.

FIG. 2 illustrates block diagram of a routine generation device for generating one or more alternative routines to a user, according to an embodiment of the disclosure.

The routine generation device 103 may include Central Processing Units 203 (also referred as "CPUs" or "processor 203"), Input/Output (I/O) interface 201, and a memory 202. In some embodiments, the memory 202 may be communicatively coupled to the processor 203. The memory 202 stores instructions executable by the processor 203. The processor 203 may include at least one data processor for executing program components for executing user or system-generated requests. The memory 202 may be communicatively coupled to the processor 203. The memory 202 stores instructions, executable by the processor 203, which, on execution, may cause the processor 203 to generate the one or more alternative routines 106 to the user 102.

In an embodiment, the memory 202 may include one or more modules 209 and data 204. The one or more modules 209 may be configured to perform the steps of the disclosure using the data 204, to generate the one or more alternative routines 106 to the user 102. In an embodiment, each of the one or more modules 209 may be a hardware unit which may be outside the memory 202 and coupled with the routine generation device 103. As used herein, the term modules 209 refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide described functionality. The one or more modules 209 when configured with the described functionality defined in the disclosure may result in a novel hardware. Further, the I/O interface 201 is coupled with the processor 203 through which an input signal or/and an output signal is communicated. For example, the routine generation device 103 may receive the routine 101 of the user 102 via the I/O interface 201. Also, the routine generation device 103 may transmit the generated one or more alternative routines 106 via the I/O interface 201 to the user 102. In an embodiment, the routine generation device 103, for generating the one or more alternative routines 106 to the user 102, may be implemented in a variety of computing systems, such as a laptop computer, a desktop computer, a Personal Computer (PC), a notebook, a smartphone, a tablet, e-book readers, a server, a network server, a cloud-based server and the like.

In an embodiment, the modules 209 may include a routine monitor module 210, a semantic information determination module 211, an alternative routine generation module 212 and other modules 213. It will be appreciated that such aforementioned modules 209 may be represented as a single module or a combination of different modules. The modules 209 may be implemented as at least one hardware processor. The at least one hardware processor may be the processor 203. In one implementation, the data 204 may include, for example, routine data 205, semantic information data 206, alternative routine generation data 207, and other data 208.

In an embodiment, the routine monitor module 210 may monitor the routine 101 of the user 102. The routine 101 is pre-determined based on the operational state of the one or more IoT devices, a corresponding timestamp associated with the operational state of the one or more IoT devices, and settings of the one or more IoT devices for a pre-determined time period. The routine 101 may be stored as the routine data 205 in the memory 202. The routine data 205 may include the operational states, the corresponding timestamps, and the settings of the one or more IoT devices. In an embodiment, the routine monitor module 210 may receive the routine 101 from the user 102. The user 102 may provide information related the at least one activity 107, the one or more IoT devices used to perform the at least one activity 107, and the timestamps of performing the at least one activity 107 to the routine monitor module 210. For example, the user 102 may provide the routine 101 as A1 using D1 at timestamp T1, A2 using D2 at timestamp T2, and A3 using D3 at timestamp T3 on weekdays. Similarly, the user 102 may provide the routine 101 of weekends to the routine generation device 103.

In an embodiment, the semantic information determination module 211 receives the routine 101 from the routine monitor module 210. The semantic information determination module 211 is configured to determine the semantic information of the at least one activity 107 in the routine 101 and the semantic information of the one or more alternative activities 108 corresponding to the at least one activity 107. The one or more alternative activities 108 may be associated with the one or more alternative IoT devices. The semantic information is determined based on correlation of operational state, the corresponding timestamp, and settings of the one or more alternative IoT devices and the one or more IoT devices. For example (referred as first example), the user 102 may switch on a dehumidifier mode of the AC. The semantic information may include setting the humidity level and target temperature of the air conditioner. The semantic information determination module 211 may determine semantic information of an alternative activity associated with an alternative IoT device. The semantic information associated with an activity of switching on the dehumidifier may be to set the humidity level. Similarly, the semantic information determination module 211 may determine the semantic information of other alternative activities. The semantic information of the at least one activity 107 in the routine 101 and the semantic information of the one or more alternative activities 108 may be stored as the semantic information data 206 in the memory 202.

In an embodiment, the alternative routine generation module 212 may receive the semantic information data 206 from the semantic information determination module 211. The alternative routine generation module 212 may be configured to generate the one or more alternative routines 106 based on the determination of the semantic information. Referring to the first example, the alternative routine generation module 212 may determine that the air conditioner in the dehumidifier mode may be replaced with the dehumidifier in the IoT environment 100 to save power. The one or more alternative IoT devices may be either, different IoT devices from the first set of IoT devices 104 or the same one or more IoT devices operated in different settings. In the first example, alternative IoT device is different from IoT device in the routine 101. In another example, an alternative routine may be generated including interactions of the user 102 with the AC in a normal mode, instead of the AC in the dehumidifier mode. In this example, alternative IoT device is the same IoT device in the routine 101 operated in a different operational state.

Further, the alternative routine generation module 212 may assign an experience score to the at least one activity 107 and to the one or more alternative activities 108. The experience score may be associated with the user 102 operating the one or more IoT devices corresponding to the at least one activity 107. Also, the experience score may be associated with the user 102 operating the one or more alternative IoT devices corresponding to the one or more alternative activities 108. The alternative routine generation module 212 may generate the one or more alternative routines 106 based on the experience score. The alternative routine generation module 212 may generate the one or more alternative routines 106 when the experience score assigned to the one or more alternative activities 108 is greater than the experience score assigned for the at least one activity 107. The experience score is assigned based at least on one or more rules and is determined based on interactions of the user 102 with the one or more IoT devices and the one or more alternative IoT devices. The one or more rules may be derived from one or more parameters. The one or more parameters may include at least one of a comfort level (e.g., low sound) which may be estimated differently when using an IoT device from the first set of IoT devices and when using an IoT device from the second set of IoT devices, a convenience level (e.g., voice enabling operations for the IoT devices, face recognition for enabling the IoT devices, etc.) when using the one or more IoT devices, a new IoT device in an IoT environment 100, a performance level (e.g., cooling performance such as wide-space cooling, warming performance such as wide-space warming, safe unlocking performance such as safe unlocking using face recognition or fingerprint recognition for opening a front door) of the one or more IoT devices, cost-effective level (or cost-effectiveness) associated with power consumption when the one or more IoT devices are used, features of the one or more IoT devices, time optimization level (e.g., cooling performance such as rapid cooling, warming performance such as rapid warming, fast unlocking performance using password entry, face recognition or fingerprint recognition for opening the front door) when performing one or more alternative activities 108 and current availability of the one or more IoT devices. In an example, the user 102 may watch news on a television at 9 AM daily. The TV may be occupied by other user at 9 AM on a particular day. The alternative routine generation module 212 may generate an alternative routine including interaction with an AI speaker such as a digital assistant device or an application in a mobile phone to provide similar service to watching news on the television.

In an embodiment, the experience score is 90 with respect to the security level when the front door is opened with face recognition and the experience score is 70 with respect to the security level when the front door is opened with fingerprint recognition. If the front door is currently opened with the fingerprint recognition and it is detected that nobody exits in the user's house, the security level is the most important factor and thus the alternative routine may be generated to use the face recognition for opening the door instead of the fingerprint recognition based on higher experience score of 90 with respect to the security level. The security level may be determined to be high when the monitoring result of a space (indoor space such as a house, an office, or a room) by a CCTV camera as one of the IoT devices indicates that nobody is found in the space.

Further, the alternative routine generation module 212 may select an alternative routine from the one or more alternative routines 106 based on selection criteria for the one or more alternative routines 106. In an embodiment, the selection criteria may be based on the experience score assigned to the one or more IoT devices and the one or more alternative IoT devices, and interactions of the user 102 with the one or more IoT devices and the one or more alternative IoT devices. For example, the routine 101 may include the interaction of the user 102 with an air purifier. A first alternative routine may include interactions of the user 102 with an AC in a normal mode. A second alternative routine may include interaction of the user 102 with AC in a turbo mode which enables a rapid cooling of a room or a house. In an embodiment, the experience score may be a vector of values. The values may be associated with the one or more parameters. The experience score of operating the AC in the turbo mode may be lower than the experience score of operating the AC in the normal mode with respect to the comfort level enjoyed by the user 102 due to the operation sound emitted from the AC. Also, the experience score of operating the AC in the normal mode may be greater than the experience score of operating the AC in the turbo mode with respect to cost-effective level associated with a power consumption. The alternative routine generation module 212 may select the second alternative routine considering the comfort level of the user 102 based on past interactions of the user 102 with the one or more IoT devices. The past interactions of the user 102 with the one or more IoT devices may be recorded and stored in the memory 202.

The alternative routine generation module 212 may determine the one or more alternative IoT devices based on detecting the operational state of the first set of IoT devices 104 and the second set of IoT devices 105, a corresponding timestamp associated with the operational state of the first set of IoT devices 104 and the second set of IoT devices 105, and settings of the one or more IoT devices from the first set of IoT devices 104. The alternative routine generation module 212 may detect a deviation from the routine 101 based on at least one of the operational state and the settings of the one or more IoT devices. Further, the alternative routine generation module 212 may detect a change in the operational state of the second set of IoT devices 105. The alternative routine generation module 212 may determine the one or more alternative IoT devices based on the detection of the change. For example, a device among the second set of IoT devices may be a temperature sensor. The alternative routine generation module 212 may update or regenerate the one or more alternative routines 106 including interaction of the user 102 with the AC operating in different modes and temperature settings according to value of the temperature sensor. The one or more alternative routines 106, the experience score, the selection criteria, the operational states, the corresponding timestamps and the settings of the second set of IoT devices may be stored as the alternative routine data 207 in the memory 202. In an embodiment, the alternative routine data 207 may further include the experience score, the selection criteria, the operational states, the corresponding timestamps and the settings of the first set of IoT devices to identify the differences between the previous routine and the alternative routine.

The other data 208 may store data, including temporary data and temporary files, generated by the one or more modules 209 for performing the various functions of the routine generation device 103. The one or more modules 209 may also include the other modules 213 to perform various miscellaneous functionalities of the routine generation device 103. For example, the other modules 213 may include a user interface to display the generated one or more alternative routines 106. In an embodiment, the one or more alternative routines 106 may be presented as a text form, a voice form, and the like. The other modules 213 may include a routine generation module to generate the routine 101 of the user 102. The routine generation module may monitor the operational state of the one or more IoT devices, a corresponding timestamp associated with the operational state of the one or more IoT devices, and settings of the one or more IoT devices, and for the pre-determined time period. The routine generation module may generate the routine 101 based on the monitoring. For example, the routine generation module may monitor the operational state, the corresponding timestamp, the settings of the one or more IoT devices for a month to generate the routine 101 of the user 102. The generated routine 101 may be stored as the other data 208 in the memory 202. It will be appreciated that the one or more modules 209 may be represented as a single module or a combination of different modules.

FIG. 3 is a flow chart for generating alternative routines to a user in an IoT environment, according to an embodiment of the disclosure.

As illustrated in FIG. 3, the method 300 may be described in a general context of computer executable instructions. Generally, computer executable instructions can include routines, programs, objects, components, data structures, procedures, modules, and functions, which perform particular functions or implement particular data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

In operation 301, the routine 101 of the user 102 is monitored by the routine generation device 103. As described before, the routine 101 may be pre-determined by a sequence of inputs by the user. Alternatively, the user 102 may provide the information related to the routine 101 to the routine generation device 103. In another embodiment, the routine generation device 103 may automatically generate the routine 101 of the user 102 based on user activities associated with a first set of IoT devices participating in the routine 101 and interactions between the user and the first set of IoT devices over a predetermined period of time. The routine generation device 103 may monitor the operational state, a corresponding timestamp associated with the operational state of the first set of IoT devices, and the settings of the first set of IoT devices for the pre-determined time period to generate the routine 101.

Figure 4A:
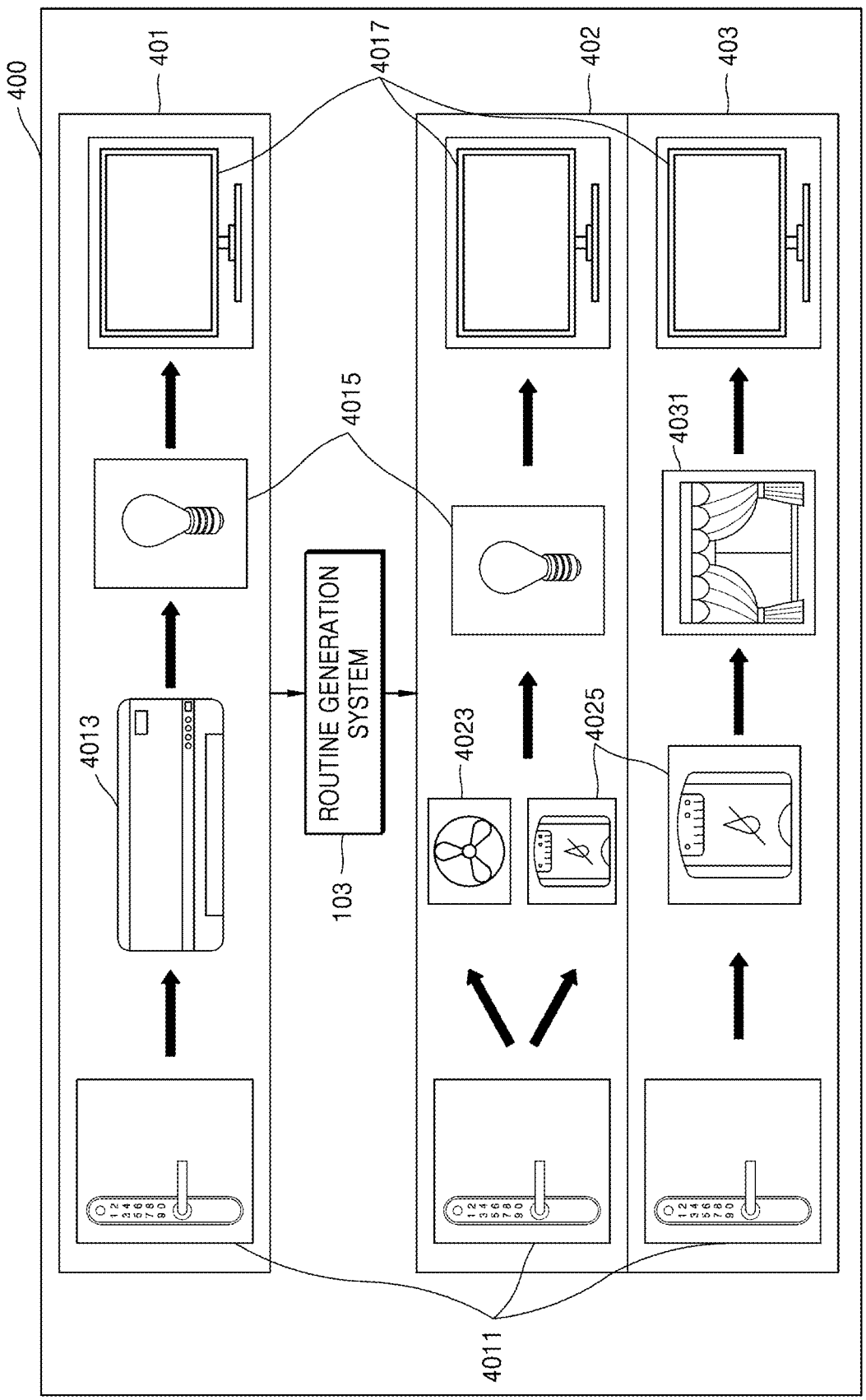
FIG. 4A illustrates generating alternative routines, according to an embodiment of the disclosure.
Figure 4B:
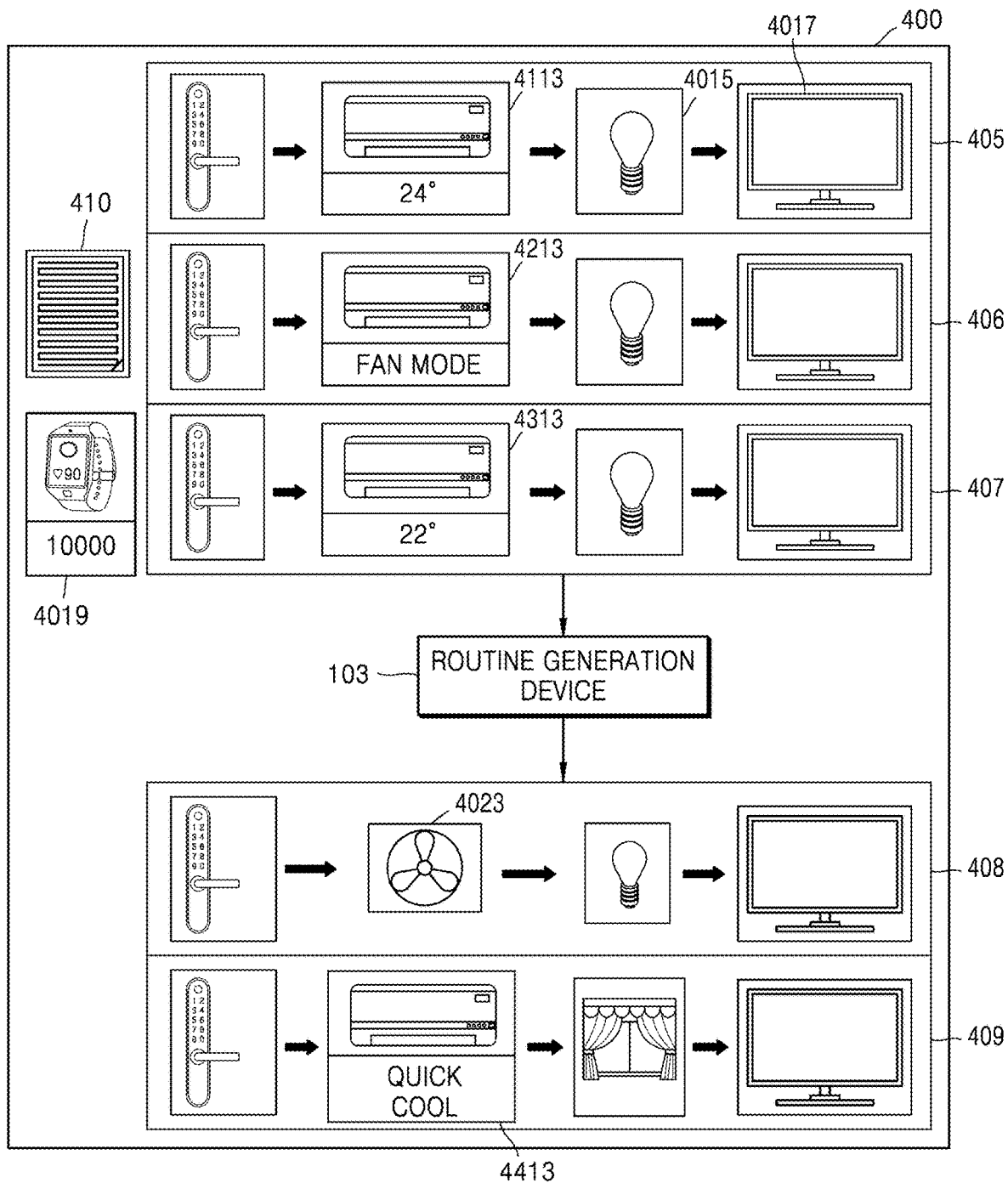
FIG. 4B illustrates generating alternative routines, according to an embodiment of the disclosure.

FIG. 4A illustrates generating alternative routines, according to an embodiment of the disclosure. Referring to an illustration of diagram 400 shown in FIG. 4A, the routine generation device 103 may monitor the routine 401 of the user 102. The routine 401 includes activities such as using a smart door to enter a house 4011, powering on the AC 4013, powering on a light bulb 4015, and watching a television 4017. The routine 401 includes interactions of the user 102 with the one or more IoT devices such as the smart door, the AC, the light bulb, and the television.

Referring back to FIG. 3, in operation 303, semantic information of the at least one activity 107 in the routine 101 and semantic information of the one or more alternative activities 108 are determined by the routine generation device 103. The one or more alternative activities 108 correspond to the at least one activity 107 associated with the one or more alternative IoT devices. The semantic information is based on a correlation of the operational state, the corresponding timestamp, and settings of the one or more alternative IoT devices and the one or more IoT devices. Referring back to the illustration of diagram 400 in FIG. 4A, the AC may be powered on in a dehumidifier mode. The semantic information may be setting the humidity and temperature of the AC. The routine generation device 103 may determine semantic information of an alternative activity associated with at least one alternative IoT device. The semantic information associated with an activity of powering on the dehumidifier 4025 may be to set humidity level. Similarly, the semantic information associated with an activity of powering on a fan 4023 may be to cool down the surroundings.

Referring back to FIG. 3, in operation 305, the one or more alternative routines 106 may be generated by the routine generation device 103. The one or more alternative routines 106 may include the one or more alternative activities 108 to the user 102. The routine generation device 103 may generate the one or more alternative routines 106 based on the determination of the semantic information. Referring to the illustration of diagram 400 in FIG. 4A, the routine generation device 103 generates the alternative routine 402 based on the semantic information. The alternative routine 402 may include powering on the dehumidifier 4025 and powering on the fan 4023 instead of powering on the AC 4013. The dehumidifier may be a new IoT device in the IoT environment 100. The alternative routine 402 including interactions of the user 102 with the new IoT devices such as the dehumidifier and the fan may be generated. In an embodiment, another alternative routine 403 may be generated. The alternative routine 403 may be recommend to the user 102, via a user interface of the routine generation device 103, to open a window instead of using the fan and the light based on a parameter of cost-effectiveness. Opening a window may save a cost of the user 102. Further, the routine generation device 103 may assign different experience scores for the at least one activity 107 and the one or more alternative activities 108 with respect to the cost-effectiveness. In generating the alternative routine 403, the routine generation device 103 may also take time information into consideration to replace powering on the light bulb with opening the window. In other words, during the night time, the activity of opening the window may not be an alternative activity to the activity of powering on the light bulb. Likewise, the routine generation device 103 may also consider location information of the user with a GPS sensor to determine one activity associated with an IoT device can be used to replace an activity associated with another IoT device included in the routine to be replaced by an alternative routine. In an embodiment, the location information may be another basis for generating the semantic information. The alternative routine generation module 212 may generate the one or more alternative routines 106 based on the experience score. The alternative routine generation module 212 may generate the one or more alternative routines 106 when the experience score assigned to the one or more alternative activities 108 is greater than the experience score assigned to the at least one activity 107. The experience score is assigned based at least on the one or more rules and is determined based on interactions of the user 102 with the one or more IoT devices and the one or more alternative IoT devices. The one or more rules may be derived from the one or more parameters. For example, the experience score when the air conditioner is used in a dehumidifier mode may be 30 in a scale of 1-100 when a parameter is 'cost-effective level'. In an embodiment, an experience score of 30 represents 30% better than the baseline (default routine operation). In other words, using the AC in the dehumidifier mode may be 30% better in terms of a cost effectiveness level than using a device in a default routine operation. The experience score may be generated based on the interactions of the user 102 with the one or more IoT devices. In an embodiment, the experience score may be calculated based on semantic information and activities associated with IoT devices. For example, with respect to the semantic information of 'opening the door', there may be 3 ways of opening the door such as 1) by inputting the predetermined passcode, 2) by face recognition, and 3) using NFC from a smartwatch. The processor 203 may determine the steps as one of attributes for all of the 3 ways, in which 1) would have n steps (n is the number of characters in the passcode), 2) would have 0 step, and 3) would have 1 step of tapping the smartwatch. These step calculations may be extracted from the semantic information and the experience score may be determined from the step calculations with respect to the convenience level. Here, 1) would have least experience scores because 1) is the baseline (default) routine, 2) may have the highest experience score because 2) is the most convenient way of opening the door, and 3) would have some intermediate score better than the baseline but less convenient than 2).

In an embodiment, the experience score may be inputted by the user for each of IoT devices and parameters. The experience score when the dehumidifier with using a fan is used may be 65 in a scale of 1-100 with respect to the parameter—'cost-effectiveness' or 'cost effective level'. That is to say, using the dehumidifier and the fan may give 35% higher experience score with respect to the parameter of 'cost-effectiveness' than using the AC in the dehumidifier mode. The routine generation device 103 may generate the alternative routine 402 including interaction of the user 102 with the dehumidifier, since the experience score of operating the dehumidifier with respect to the parameter of 'cost-effectiveness' is greater than the experience score of operating the AC in the dehumidifier mode. On the other hand, the routine generation device 103 may generate the alternative routine 402 including using the AC in the dehumidifier mode because the experience score of operating the air conditioner in the dehumidifier mode with respect to the parameter of 'comfort level' may be greater than the experience score of operating the humidifier with the fan.

Further, the routine generation device 103 may select an alternative routine from the one or more alternative routines 106 based on selection criteria for the one or more alternative routines 106. In an embodiment, the selection criteria may be determined based on the experience score assigned to the one or more IoT devices and the one or more alternative IoT devices, and interactions of the user 102 with the one or more IoT devices and the one or more alternative IoT devices. For example, the alternative routine 403 may be selected considering the comfort level of the user 102 based on time information—i.e., when it is night time. In an embodiment, one of the parameters may be prioritized based on at least one of the time information, location information of the user, and user settings. For example, if the user setting indicates that weekly power consumption is limited to a power threshold value and the power consumption exceeds the power threshold values, the parameter of 'cost-effective level' may be most prioritized among various parameters and the alternative routine may be updated according to the prioritized parameter and the corresponding experience score. In an embodiment, the prioritized parameter may be automatically updated based on, for example, current temperature, location information of the user and/or time information. If the user comes back to his or her house from the office based on the location information of the user, it is 35° C. outside the house and 33° C. inside the house, the parameter of 'performance level—cooling down' may be the most prioritized parameter among the parameters by the routine generation device 103. The selection criteria may be determined based on at least one of the prioritized parameter and past interactions of the user 102 with the one or more IoT devices.

In an embodiment, the routine generation device 103 may determine the one or more alternative IoT devices based on detecting the operational state of the first set of IoT devices 104 and the second set of IoT devices 105, a corresponding timestamp associated with the operational state of the first set of IoT devices 104 and the second set of IoT devices 105, and settings of the one or more IoT devices from the first set of IoT devices 104. The alternative routine generation module 212 may detect a deviation from the routine 101 based on at least one of the operational state and the settings of the one or more IoT devices. Further, the alternative routine generation module 212 may detect a change in the operational state of the second set of IoT devices 105. The alternative routine generation module 212 may determine the one or more alternative IoT devices based on the detection.

FIG. 4A illustrates generating alternative routines, according to an embodiment of the disclosure. Referring to 404 of FIG. 4B, the routine 405 is monitored by the routine generation device 103. The AC 4113 is operated at 24° C. The routine generation device 103 determines that the user 102 has operated the AC 4213 in a FAN mode as shown in routine 406 when the operational state of a rain sensor 410 is ON state in the past. The routine generation device 103 may generate the alternative routine 408 by considering the interaction of the user 102 with the fan 4023, when the operational state of the rain sensor is in an ON state. In another example, the routine generation device 103 determines that the user 102 has operated the AC 4313 at 22° C. as shown in routine 407, when the user 102 has exercised more (for example, when the user has walked 10000 steps recorded in the user's smartwatch 4019) in the past. The routine generation device 103 may generate the alternative routine 409 including the interactions of the user 102 with the AC 4413 in a quick cool mode, when a step count of the user 102 is more than a threshold.

Figure 5:
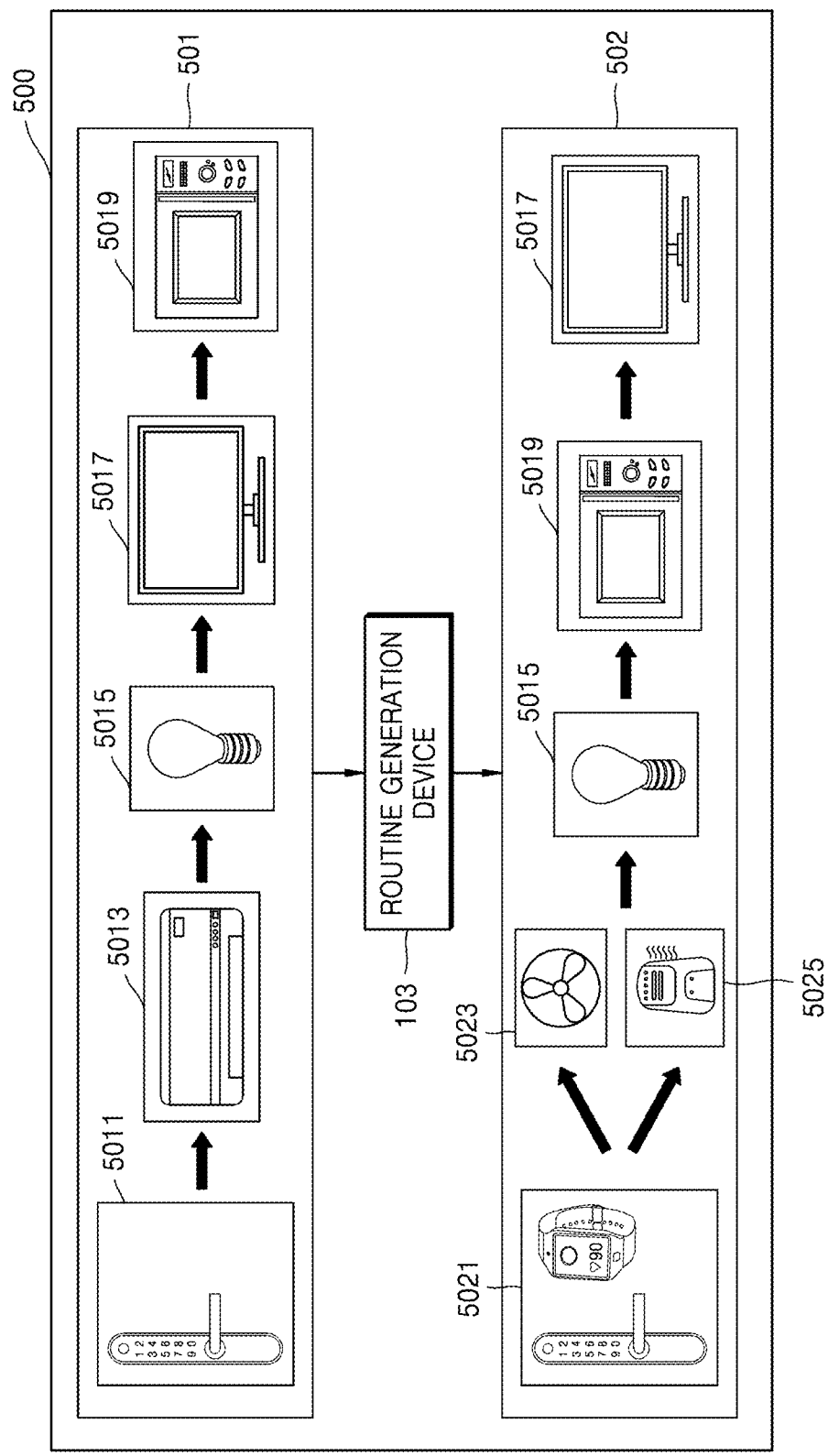
FIG. 5 illustrates generating alternative routines to a user in an IoT environment, according to an embodiment of the disclosure.

FIG. 5 illustrates a diagram 500 for generating alternative routines to a user in an IoT environment, according to an embodiment of the disclosure. Referring to FIG. 5, the routine 501 of the user 102 is monitored by the routine generation device 103. An existing routine 501 of the user 102 includes unlocking the smart door using a passcode 5011, switching on an AC 5013, switching on a light bulb 5015, watching a television 5017, and baking a cake in a microwave oven 5019. The routine generation device 103 may generate an alternative routine 502 as unlocking the door using a smartwatch 5021, switching on a dehumidifier 5025 and a fan 5023, switching on the light bulb 5015, baking a cake in the microwave oven 5019, and watching the television 5017. Unlocking the door using the smartwatch 5021 is easier than unlocking the door using the passcode 5011 as the user may not physically interact with the smart door. Switching on the dehumidifier 5025 and the fan 5023 enhances the comfort level of the user 102. Reordering of baking a cake with the microwave oven 5019 and watching television 5017 may save the time (time optimization level) of the user 102. Hence, the alternative routine 502 is generated such that the user experience is enhanced based on the experience score.

In an embodiment, the user 102 may provide a feedback on the generated one or more alternative routines. The one or more alternative routines may be prioritized based on the feedback of the user 102. For example, a first alternative routine may include an interaction of the user 102 with an AC. A second alternative routine may include an interaction of the user 102 with a fan. The user 102 may prefer using the fan than using the AC in consideration of 'comfort level'. The second alternative routine may be provided with a higher priority than the first alternative routine based on the user's preference.

In an embodiment, the routine generation device 103 may generate the one or more alternative routines 106 including interactions of the user 102 with a new IoT device in the IoT environment 100. For example, the user 102 may listen to songs on a television. Also, the user 102 may interact with a smartphone assistant using voice commands. The smartphone assistant may not capture the voice commands of the user because of loud sound from the television. The routine generation device 103 may generate an alternative routine including a new voice controller which enables playing songs for the user 102 by detecting the voice commands of the user 102 even with a loud sound interference of the television.

The alternative routines may be generated with the same IoT devices used in the routine but may have at least different one of operational states, timestamps including an order of the activities of the routine, or settings of the IoT devices used in the routine.

Figure 6:
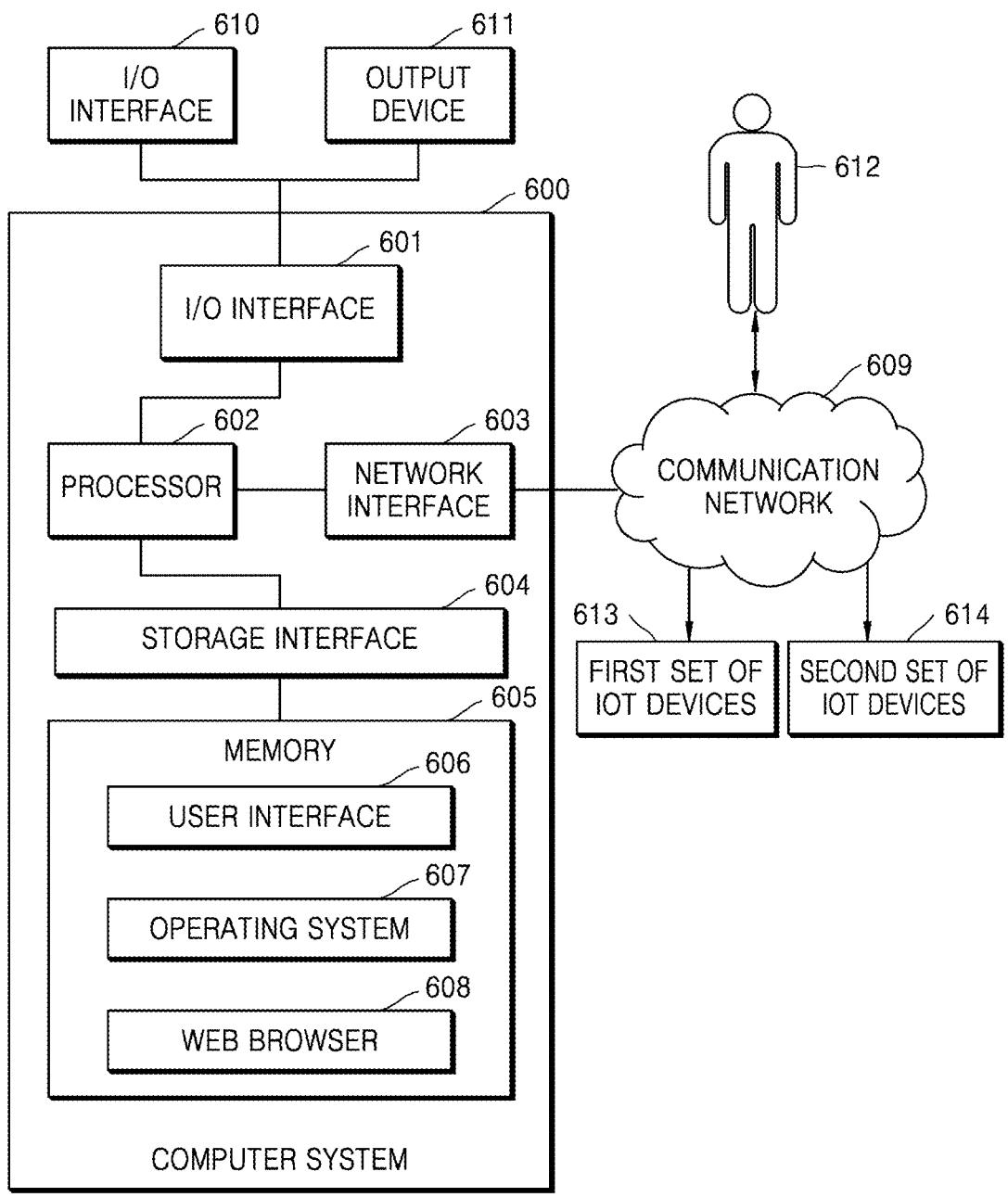
FIG. 6 illustrates a block diagram of an exemplary computer system for implementing embodiments, according to an embodiment of the disclosure.

FIG. 6 illustrates a block diagram of an exemplary computer system 600 for implementing embodiments, according to an embodiment of the disclosure.

In an embodiment, the computer system 600 may be used to implement the routine generation device 103. Thus, the computer system 600 may be used to generate the one or more alternative routines 106 to the user 612 by communicating with the user, the first set of IoT devices 613 and the second set of IoT devices 614. The computer system 600 may communicate the generated one or more alternative routines 106 to the user 102. The computer system 600 may include a Central Processing Unit 602 (also referred as "CPU" or "processor"). The processor 602 may include at least one data processor. The processor 602 may include specialized processing units such as integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices. For example, the input device 610 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 611 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The computer system 600 is connected to the integrated system through a communication network 609. The integrated system is used to provide the detected energy levels to the computer system 600. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607, web browser 608 etc. In some embodiments, computer system 600 may store user/application data, such as, the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSHR OS X, UNIXR, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLER IOS™, GOOGLER ANDROID™, BLACKBERRYR OS, or the like.

In some embodiments, the computer system 600 may implement the web browser 608 stored program component. The web browser 608 may be a hypertext viewing application, for example MICROSOFTR INTERNET EXPLORER™, GOOGLER CHROMETMO, MOZILLAR FIREFOX™, APPLER SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBER FLASH™, JAVASCRIPT™, JAVA™, Application Programming Interfaces (APIs), etc. In some embodiments, the computer system 600 may implement a mail server (not shown in FIG.) stored program component. The mail server may be an Internet mail server such as Microsoft Exchange, or the like. The mail server may utilize facilities such as ASP™, ACTIVEX™, ANSI™ C++/C#, MICROSOFTR, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFTR exchange, Post Office Protocol (POP), Simple Mail Transfer Protocol (SMTP), or the like. In some embodiments, the computer system 600 may implement a mail client stored program component. The mail client (not shown in FIG.) may be a mail viewing application, such as APPLER MAIL™, MICROSOFTR ENTOURAGE™, MICROSOFTR OUTLOOK™, MOZILLAR THUNDERBIRD™, etc.

Furthermore, one or more computer-readable storage media may be utilized in implementing embodiments consistent with the disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc Read-Only Memory (CD ROMs), Digital Video Disc (DVDs), flash drives, disks, and any other known physical storage media.

Embodiments of the disclosure determines the semantic information which helps in optimizing the generation of the alternative routines in an efficient manner. Also, different parameters with respect to cost, time, ease of use of the devices and the like are considered for the generation of the alternative routines. This may substantially improve the user experience in the IoT environment.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of generating an alternative routine, the method comprising:
    monitoring a first routine comprising a plurality of activities representing a plurality of interactions of a user with a plurality of IoT devices;
    determining semantic information associated with the plurality of activities of the first routine; and
    generating at least one second routine comprising a plurality of activities performed with a second set of IoT devices among the plurality of IoT devices replacing the plurality of activities of the first routine performed with a first set of IoT devices among the plurality of IoT devices based on the semantic information associated with the plurality of activities of the first routine and based on information indicating a power consumption by the second routine is less than a power consumption by the first routine,
    wherein the second set of IoT devices used in the at least one second routine is different from the first set of IoT devices used in the first routine and the plurality of activities performed with the second set of IoT devices are performed in a different order than the plurality of activities of the first routine.

2. The method of claim 1, wherein the first routine is predetermined based on at least one of an operational state of the plurality of IoT devices, a timestamp corresponding to the operational state of the plurality of IoT devices and settings of the plurality of IoT devices over a predetermined period of time.

3. The method of claim 1, wherein at least one of an operational state of the first set of IoT devices, a timestamp corresponding to the operational state of the first set of IoT devices and settings of the first set of IoT devices is different from at least one of an operational state of the second set of IoT devices, a timestamp corresponding to the operational state of the second set of IoT devices and settings of the second set of IoT devices.

4. The method of claim 1, wherein the determining of the semantic information comprises generating the semantic information based on at least one of an operation state of the plurality of IoT devices, a timestamp corresponding to the operation state of the plurality of the IoT devices, settings of the plurality of IoT devices, an event in connection with at least one IoT device among the plurality of IoT devices, temperature information, prior routine information comprising interactions between the user and the plurality of IoT devices, location information of the user and time information.

5. The method of claim 4, wherein the time information is associated with the event in connection with the at least one IoT device.

6. The method of claim 1, wherein the generating of the at least one second routine comprising generating the at least one second routine based on at least one experience score assigned to the plurality of activities included in the first routine and the plurality of activities included in the second routine.

7. The method of claim 6, wherein the at least one experience score is assigned to the plurality of activities included in the first routine and the plurality of activities included in the second routine based on parameters comprising at least one of a comfort level, a performance level, cost-effective level, security level and time optimization level among the one or more IoT devices used to perform the plurality of activities included in the first routine and the plurality of activities included in the second routine.

8. The method of claim 7, further comprising receiving a selection of one alternative routine among the at least one second routine recommended to the user based on at least one parameter among the parameters,
    wherein the at least one parameter is prioritized for the recommendation based on at least one of time information, location information of the user, and temperature information.

9. The method of claim 7, further comprising receiving a selection of one alternative routine among the at least one second routine recommended to the user based on at least one parameter among the parameters,
    wherein the at least one parameter is prioritized by a user's preference.

10. The method of claim 1, further comprising determining semantic information associated with the plurality of activities of the at least one second routine; and
    wherein the generating the at least one second routine comprises generating the at least one second routine based on a similarity between the semantic information associated with the plurality of activities of the first routine and the semantic information associated with the plurality of activities of the at least one second routine.

11. The method of claim 1, wherein the at least one second routine comprises experience scores of the second set of IoT devices, an operations state of the second set of IoT devices, and timestamps corresponding to the operational state of the second set of IoT devices.

12. The method of claim 1, further comprising generating the first routine based on user activities associated with the first set of IoT devices among the plurality of IoT devices and interactions between the user and the first set of IoT devices over a predetermined period of time.

13. The method of claim 12, wherein the generating of the first routine comprises monitoring operational states of the first set of IoT devices, timestamps corresponding the operational states of the first set of IoT devices, and settings of the first set of IoT devices for the predetermined period of time.

14. The method of claim 1, wherein the generating of the at least one second routine comprises generating the at least one second routine based on at least one change of an operation state of at least one IoT device among the plurality of IoT devices.

15. An apparatus for generating an alternative routine, the apparatus comprising:
   a memory which stores a first routine comprising a plurality of activities representing a plurality of interactions of a user with a plurality of IoT devices; and
   a processor configured to:
      monitor the first routine,
      determine semantic information associated with the plurality of activities of the first routine, and
      generate at least one second routine comprising a plurality of activities performed with a second set of IoT devices among the one or more IoT devices replacing the plurality of activities of the first routine performed with a first set of IoT devices among the plurality of IoT devices based on the semantic information associated with the plurality of activities of the first routine and based on information indicating a power consumption by the second routine is less than a power consumption by the first routine,
   wherein the second set of IoT devices used in the at least one second routine is different from the first set of IoT devices used in the first routine and the plurality of activities performed with the second set of IoT devices are performed in a different order than the plurality of activities of the first routine.

16. The apparatus of claim 15, wherein the determining the semantic information comprises
   generating the semantic information based on at least one of an operation state of the plurality of IoT devices, a timestamp corresponding to the operation state of the plurality of IoT devices, settings of the plurality of IoT devices, an event in connection with at least one IoT device among the plurality of IoT devices, temperature information, prior routine information comprising interactions between the user and the plurality of IoT devices, location information of the user and time information.

17. The apparatus of claim 15, wherein the generating the at least one second routine comprising generating the at least one second routine based on at least one experience score assigned to the plurality of activities included in the first routine and the plurality of activities included in the second routine.

18. A non-transitory computer readable storage medium having a computer readable instructions stored therein, when executed by at least one processor, configured to execute the computer readable instructions to cause the at least one processor to:
   monitor a first routine comprising a plurality of activities representing a plurality of interactions of a user with a plurality of IoT devices;
   determine semantic information associated with the plurality of activities of the first routine; and
   generate at least one second routine comprising a plurality of activities performed with a second set of IoT devices among the plurality of IoT devices replacing the plurality of activities of the first routine performed with a first set of IoT devices among the plurality of IoT devices based on the semantic information associated with the plurality of activities of the first routine and based on information indicating a power consumption by the second routine is less than a power consumption by the first routine,
   wherein the second set of IoT devices used in the at least one second routine is different from the first set of IoT devices used in the first routine and the plurality of activities performed with the second set of IoT devices are performed in a different order than the plurality of activities of the first routine.

* * * * *